US012263781B2

(12) United States Patent
Mizuma et al.

(10) Patent No.: US 12,263,781 B2
(45) Date of Patent: Apr. 1, 2025

(54) VEHICLE

(71) Applicant: TOYOTA JIDOSHA KABUSHIKI KAISHA, Toyota (JP)

(72) Inventors: Hayato Mizuma, Tokyo (JP); Makoto Matsushita, Ichinomiya (JP); Yuko Mizuno, Nagoya (JP); Kohei Miwa, Shizuoka-ken (JP); Naoki Yamada, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/648,809

(22) Filed: Apr. 29, 2024

(65) Prior Publication Data

US 2024/0424980 A1  Dec. 26, 2024

(30) Foreign Application Priority Data

Jun. 20, 2023  (JP) ................. 2023-100714

(51) Int. Cl.
*B60Q 1/00* (2006.01)
*B60Q 1/26* (2006.01)
*B60S 1/04* (2006.01)

(52) U.S. Cl.
CPC .......... *B60Q 1/2684* (2013.01); *B60S 1/0491* (2013.01)

(58) Field of Classification Search
CPC ........................ B60Q 1/2684; B60S 1/0491
See application file for complete search history.

(56) References Cited

U.S. PATENT DOCUMENTS

| 8,664,867 | B1 * | 3/2014 | Wood ............... | H05B 45/00 |
| | | | | 15/250.43 |
| 2004/0177466 | A1 * | 9/2004 | Ohyama ............ | B60S 1/0491 |
| | | | | 15/250.43 |
| 2018/0072274 | A1 * | 3/2018 | Salter .............. | B60Q 1/2684 |
| 2023/0076304 | A1 * | 3/2023 | Müller ............. | B60K 35/00 |
| 2023/0294596 | A1 * | 9/2023 | Wennerholm ..... | B60Q 1/46 |
| | | | | 340/471 |

FOREIGN PATENT DOCUMENTS

| JP | 2000-172802 A | 6/2000 |
| JP | 2005-271813 A | 10/2005 |
| JP | 4570869 B2 | 10/2010 |

* cited by examiner

*Primary Examiner* — Gerald J Sufleta, II
(74) *Attorney, Agent, or Firm* — Sughrue Mion, PLLC

(57) ABSTRACT

The vehicle includes a light-emitting part installed in the rear windshield wiper, a front camera that captures an image of the front of the own vehicle, a control unit that causes the light-emitting part to blink in conjunction with the operation of the rear windshield wiper to display the pattern, and a processing unit that acquires the pattern displayed by the blink of the light-emitting part of the preceding vehicle based on the image shot by the front camera.

5 Claims, 2 Drawing Sheets

VEHICLE

CROSS-REFERENCE TO RELATED APPLICATION

This application claims priority to Japanese Patent Application No. 2023-100714 filed on Jun. 20, 2023, incorporated herein by reference in its entirety.

BACKGROUND

1. Technical Field

The disclosure relates to a vehicle.

2. Description of Related Art

A vehicle described in Japanese Unexamined Patent Application Publication No. 2005-271813 (JP 2005-271813 A) includes light-emitting elements disposed arranged in a row on a windshield wiper. In this vehicle, the light-emitting elements are caused to blink in conjunction with movement of the windshield wiper, thereby displaying text, shapes, and so forth, using the afterimage effect of the human eye.

SUMMARY

In order to use the afterimage effect, the windshield wiper has to be operated at a speed significantly higher than a speed required for wiping water droplets and so forth. Accordingly, occupants may become irritated at the movement and operation noise of the windshield wiper when performing the display.

A vehicle that solves the above problem includes
a light-emitting part installed on a windshield wiper,
a camera that shoots surroundings of an own vehicle,
a control unit that displays a pattern by causing the light-emitting part to blink in conjunction with operation of the windshield wiper, and
a processing unit that acquires a pattern displayed by blinking of the light-emitting part of another vehicle, based on an image shot by the camera.

The above-described vehicle has an effect of enabling vehicle-to-vehicle communication using the light-emitting part on the windshield wiper, without operating the windshield wiper at a high speed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
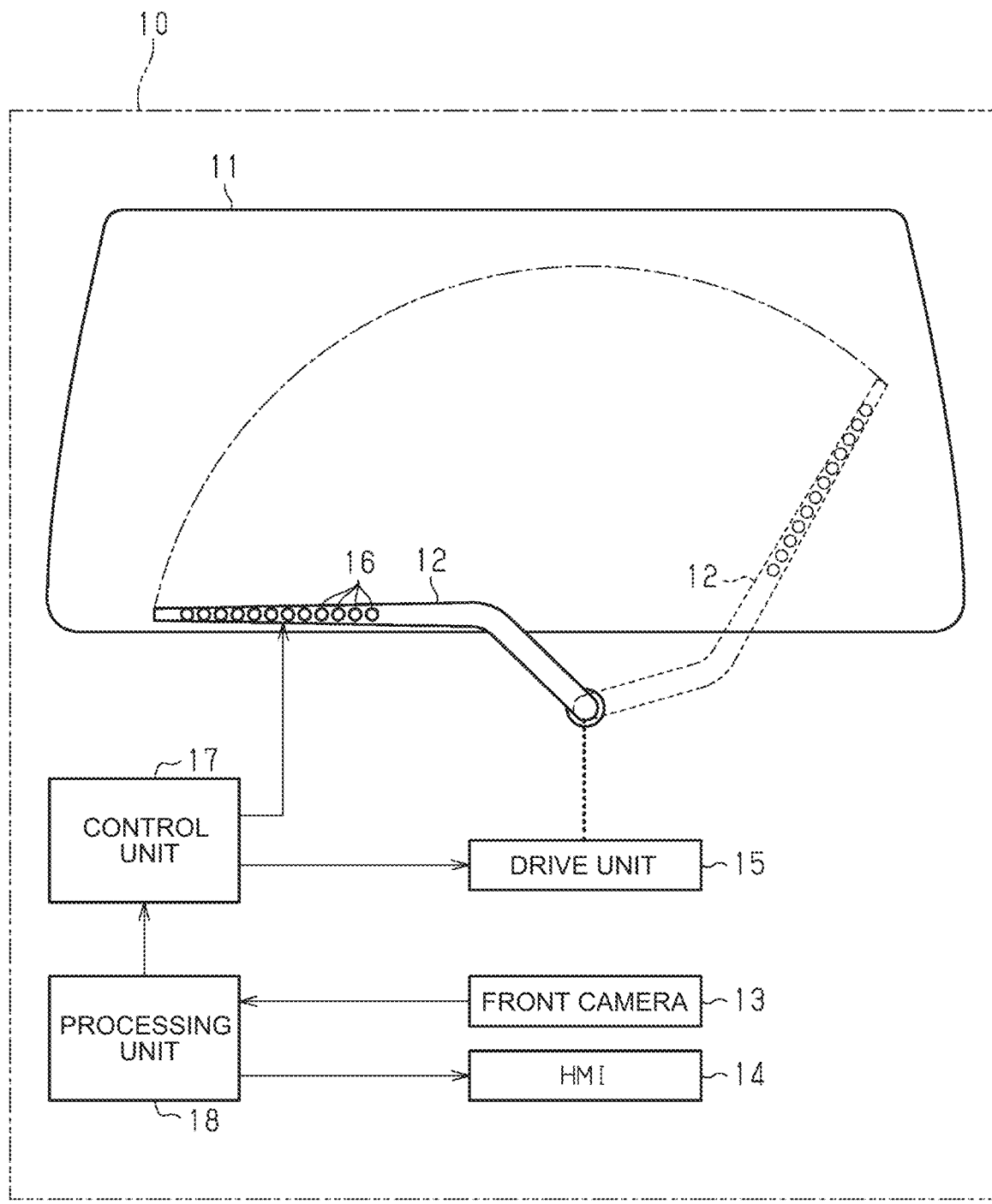
FIG. 1 is a diagram schematically illustrating a configuration of an embodiment of a vehicle.

Hereinafter, an embodiment of a vehicle will be described in detail with reference to FIGS. 1 to 3.
Configuration of the Vehicle
First, the configuration of the vehicle 10 of the present embodiment will be described with reference to FIG. 1. The vehicle 10 includes a rear windshield wiper 12 for wiping off raindrops and dirt adhering to the rear window 11. The vehicles 10 also include a front camera 13 and a human machine interface (HMI) 14. The front camera 13 is a shooting device that shoots the front of the vehicle. HMI 14 is a device for exchanging information between the vehicle 10 and an occupant. An exemplary HMI 14 is a touch panel.

The vehicle 10 includes a drive unit 15 that drives the rear windshield wiper 12. The drive unit 15 includes a motor and a link mechanism that converts the rotation of the motor into a reciprocating motion of the rear windshield wiper 12. The rear windshield wiper 12 is reciprocally driven between the stop position and the folded position by the drive unit 15. In FIG. 1, the state of the rear windshield wiper 12 when it is positioned at the stop position is indicated by a solid line. Further, in FIG. 1, the state of the rear windshield wiper 12 when positioned at the folded position is indicated by a broken line.

The rear windshield wiper 12 is provided with a plurality of light-emitting parts 16. The plurality of light-emitting parts 16 are arranged in a row on the rear windshield wiper 12. An example of the light-emitting part 16 is a light-emitting diode.

Further, a control unit 17 and a processing unit 18 are installed in the vehicle 10. The control unit 17 is an electronic circuit that controls driving of the rear windshield wiper 12 by the drive unit 15 and controls blinking of the light-emitting part 16. The processing unit 18 is an electronic circuit that processes an image shot by the front camera 13.
Vehicle-to-Vehicle Communication The vehicle 10 is configured to communicate with another vehicle 10 using the light-emitting part 16 provided in the rear windshield wiper 12 and the front camera 13. Such inter-vehicle communication is performed through the blinking control of the light-emitting part 16 by the control unit 17 and the image processing of the front camera 13 by the processing unit 18. In the following description, the vehicle 10 is referred to as an own vehicle, the vehicle 10 traveling in front of the own vehicle is referred to as a preceding vehicle, and the vehicle 10 traveling behind the own vehicle is referred to as a following vehicle.

First, the blinking control of the light-emitting part 16 performed by the control unit 17 will be described with reference to FIG. 2. FIG. 2 shows a blinking mode of the light-emitting parts 16 when four characters of "STOP" are displayed as a pattern. In FIG. 2, the light-emitting part 16 being turned on is represented by a black circle, and the light-emitting part 16 being turned off is represented by a white circle. The control unit 17 displays a pattern as shown in FIG. 2 by switching the blinking of each light-emitting part 16 in conjunction with the operation of the rear windshield wiper 12. Specifically, the control unit 17 switches the blinking of each light-emitting part 16 according to the operating position of the rear windshield wiper 12. In each operation position, the combination of the light-emitting part 16 to be turned on and the light-emitting part 16 to be turned off is determined in advance by the pattern to be displayed.

Next, image processing performed by the processing unit 18 will be described. The processing unit 18 acquires the pattern displayed by the preceding vehicle by the blinking of the light-emitting part 16 of the rear windshield wiper 12 based on the image shot by the front camera 13. Specifically, the processing unit 18 periodically acquires an image of the front camera 13 that captures the rear window 11 of the preceding vehicle, and generates a composite image obtained by combining the acquired series of images. In the acquisition period and the acquisition period of the image of the front camera 13 at this time, an appropriate period and period are set so that the preceding vehicle can generate an image indicating the pattern displayed by the blinking of the light-emitting part 16 as a composite image. Then, the processing unit 18 displays the generated composite images on HMI 14.

Operation and Effect of Embodiments

The operation and effects of the present embodiment will be described. The vehicle 10 of the present embodiment performs pattern display by causing the plurality of light-emitting parts 16 installed in the rear windshield wiper 12 to blink in conjunction with the operation of the rear windshield wiper 12. At this time, if the rear windshield wiper 12 is operated at a high speed, the occupant of the following vehicle can directly recognize the displayed pattern by the afterimage effect. However, if high-speed operation is performed as the afterimage effect is generated, there is a possibility that the occupant feels the movement and the operation sound of the rear windshield wiper 12 as troublesome. On the other hand, in the vehicle 10 of the present embodiment, the processing unit 18 processes the image shot by the front camera 13, thereby identifying the pattern displayed by the blinking of the light-emitting part 16 of the rear windshield wiper 12 of the preceding vehicle. Therefore, it is not necessary to operate the rear windshield wiper 12 at such a high speed that an afterimage effect occurs for displaying a pattern.

The vehicle 10 of the present embodiment described above has the following effects.

(1) The vehicle 10 includes a control unit 17 that causes the plurality of light-emitting parts 16 installed in the rear windshield wiper 12 to blink in conjunction with the operation of the rear windshield wiper 12. Further, the vehicle 10 includes a processing unit 18 that acquires a pattern displayed by the blinking of the light-emitting part 16 of the preceding vehicle based on an image shot by the front camera 13. Therefore, even if the rear windshield wiper 12 does not operate at a high speed, information can be transmitted to the following vehicle through the pattern display by the blinking of the light-emitting part 16. As a result, it is difficult for the occupant to feel the operation sound and the movement of the rear windshield wiper 12 for displaying the pattern.

(2) The processing unit 18 notifies the occupant of information indicated by the pattern acquired based on the image of the front camera 13. Therefore, it is possible to transmit information to the occupant of the following vehicle.

(3) When the blinking of the light-emitting part 16 is checked by a human eye, it is necessary to increase the luminous intensity of the light-emitting part 16 in a bright environment such as in the daytime. However, if the luminous intensity of the light-emitting part 16 is increased, there is a possibility that an occupant or the like of another vehicle looking at the luminous intensity may feel glare. In the vehicle 10 of the present embodiment, the blinking of the light-emitting part 16 is confirmed by the front camera 13. Therefore, it is possible to suppress the luminous intensity of the light-emitting part 16 to such an extent that the light-emitting part does not feel glare even when viewed by a person.

Other Embodiments

The present embodiment can be modified as follows. The present embodiment and the following modifications can be implemented in combination with each other as long as they are not technically contradictory.

Communication to Multiple Vehicles

The vehicle 10 of the above-described embodiment is configured to transmit information to a subsequent vehicle by blinking of the light-emitting part 16. The above-described vehicle 10 can perform information transmission between three or more vehicles by configuring as follows.

Figure 3:
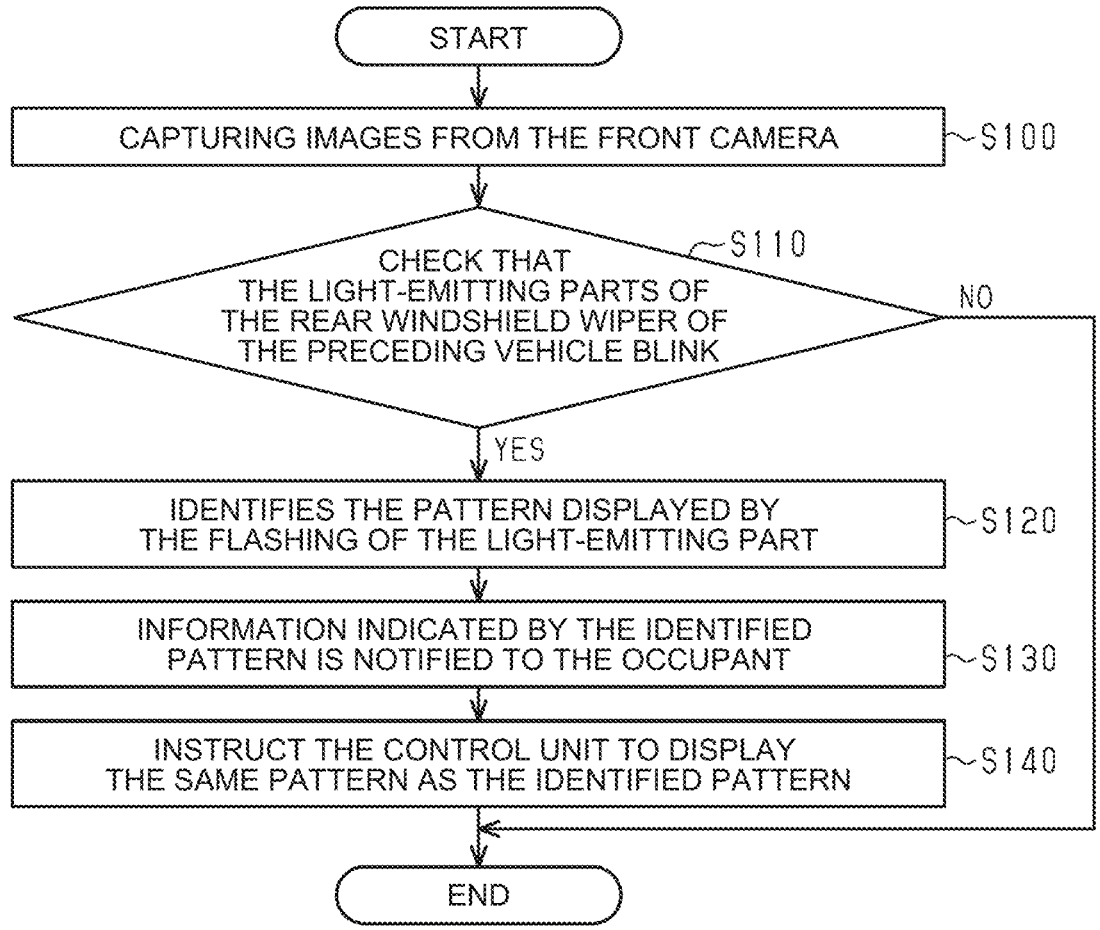
FIG. 3 is a flow chart illustrating a flow of processing executed by a processing unit in a modification of a vehicle.

FIG. 3 shows a flow of processing executed by the processing unit 18 in the vehicle 10 in such a case. The processing unit 18 repeatedly executes the processing illustrated in FIG. 3 for each predetermined control period while the vehicle 10 is traveling. When the processing of FIG. 3 is started, the processing unit 18 first captures images shot by the front-camera 13 in S100. In the following S110, the processing unit 18 checks whether or not the light-emitting part 16 of the rear windshield wiper 12 of the preceding vehicle is flashing based on the acquired images. Then, when the flashing of the light-emitting part 16 is confirmed (S100: YES), the processing unit 18 advances the processing to S120. When the blinking of the light-emitting part 16 is not confirmed (S110: NO), the processing unit 18 ends the processing in the current control cycle.

When the process proceeds to S120, the processing unit 18 identifies the pattern displayed by the blinking of the light-emitting part 16 of the preceding vehicle on the basis of the series of images shot by the front-camera 13 in S120. In the following S130, the processing unit 18 notifies the occupant of the information indicated by the identified pattern. Further, in the subsequent S140, the processing unit 18 instructs the control unit 17 to display the same pattern as the identified pattern.

In such a case, the vehicle 10 blinks the light-emitting part 16 of its rear windshield wiper 12, thereby displaying the same pattern as the pattern displayed by the preceding vehicle. Accordingly, the information transmitted from the preceding vehicle to the own vehicle is further transmitted to the following vehicle. When the processing unit 18 of the following vehicle performs the same processing, the same information is further transmitted to the vehicle 10 traveling behind the following vehicle. As a result, since the information is sequentially transmitted to the following vehicles, the information can be transmitted to a large number of vehicles 10.

Notification to Occupants

The processing unit 18 may reproduce a series of images shot by the front camera 13 at a high speed in HMI 14 so as to present a pattern displayed by the blinking of the light-emitting part 16 of the preceding vehicle to the occupant. In the images displayed on HMI 14, the rear windshield wiper 12 operates at a higher speed than the actual speed. Therefore, even if the rear windshield wiper 12 does not actually operate at a high speed, the occupant can recognize the pattern displayed by the blinking of the light-emitting part 16 by the afterimage effect.

The processing unit 18 may read the information indicated by the pattern from the pattern acquired based on the image of the front camera 13, convert the read information into characters, sounds, or the like, and notify the occupant of the read information.

A pattern indicating information used for controlling the automatic travel of the vehicle 10 or the like may be displayed by blinking of the light-emitting part 16. In this case, if it is not necessary to notify the occupant of the information indicated by the pattern to be displayed, the notification to the occupant may be omitted.

About the Displayed Pattern

The pattern displayed by the blinking of the light-emitting part 16 interlocked with the operation of the rear windshield wiper 12 may be sequentially switched, and a plurality of patterns may be connected to each other to transmit information. For example, a character to be displayed as a pattern may be switched for each round-trip of the rear windshield wiper 12, and a combination of the characters may be transmitted to a subsequent vehicle as a message.

The control unit 17 may display a pattern other than a character or an image by blinking the light-emitting part 16 interlocked with the operation of the rear windshield wiper 12. For example, the control unit 17 may perform blinking control of the light-emitting part 16 so as to display a two-dimensional code indicating information to be notified to the following vehicle as the pattern. In this case, the processing unit 18 acquires the two-dimensional code displayed by the blinking of the light-emitting part 16 of the preceding vehicle based on the image of the front camera 13. Then, the processing unit 18 decodes the acquired two-dimensional code, so that information can be transmitted between vehicles.

Light-Emitting Parts

Figure 2:
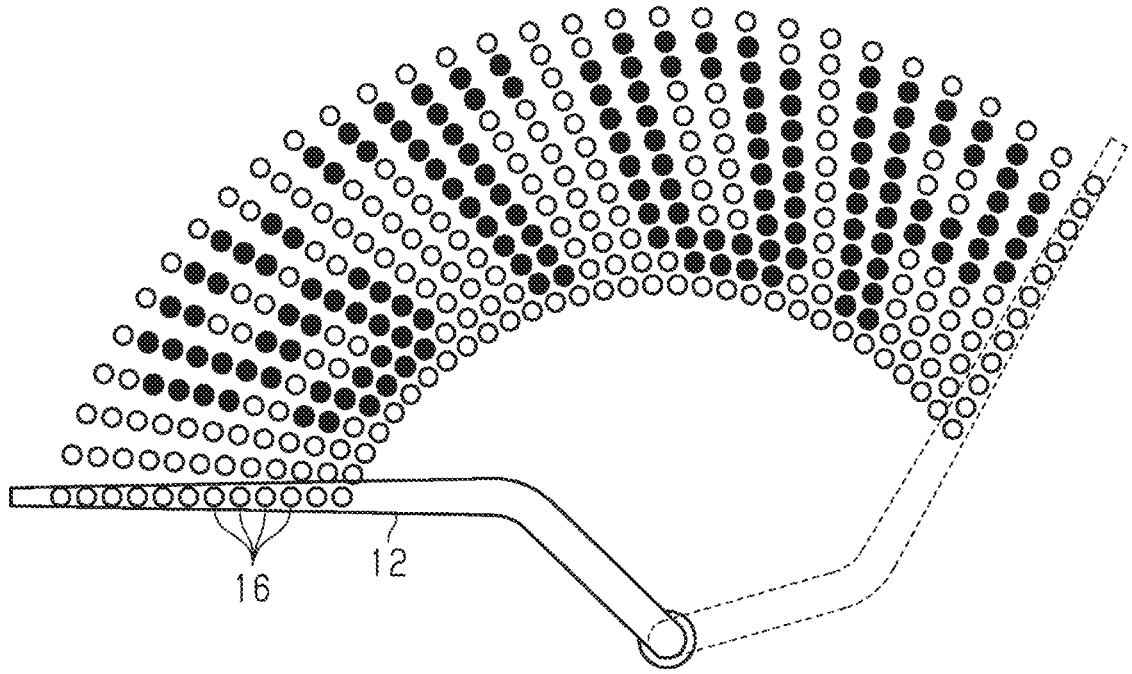
FIG. 2 is a diagram illustrating an exemplary pattern-display in the vehicle.

The number and arrangement of the light-emitting parts 16 installed in the rear windshield wiper 12 may be different from those in FIG. 1.

In the vehicle 10, the blinking of the light-emitting part 16 is confirmed by the front camera 13. Therefore, a component that emits light having a wavelength outside visible light, such as an infrared light-emitting part or an ultraviolet light-emitting part, can be adopted as the light-emitting part 16. In such a case, it is avoided that the occupant of the following vehicle or the like feels the blinking of the light-emitting part 16 troublesome.

Other

The light-emitting part 16 may be installed in a front windshield wiper of the vehicle 10. In this case, the processing unit 18 shoots the blinking of the light-emitting part 16 installed in the front windshield wiper of the following vehicle by a rear camera that captures an image of the rear of the vehicle, and acquires a pattern displayed by the blinking.

As long as the camera shoots an image of the surroundings of the own vehicle, for example, a camera that shoots an image of the entire circumference of the vehicle 10 may be used to shoot an image of the blinking of the light-emitting part 16 of the surrounding vehicle 10.

Each of the control unit 17 and the processing unit 18 may be configured as a circuit including one or more dedicated hardware circuits such as one or more processing units that operate in accordance with a computer program, and dedicated hardware that executes at least some of various processes, or a combination thereof. Dedicated hardware may include, for example, an ASIC that is an application-specific integrated circuit. The processing unit includes a CPU and a memory, such as a RAM and ROM, the memory storing program code or instructions configured to cause CPU to perform the process. Memory, or storage media, includes any available media that can be accessed by a general purpose or special purpose computer. In addition, the vehicle 10 may be configured such that a single circuit performs processing of both the control unit 17 and the processing unit 18.

What is claimed is:

1. A vehicle, comprising:
    a light-emitting part installed on a windshield wiper, the light emitting part including at least one a visible light source or a non-visible light source;
    a camera configured to capture an image of surroundings of the vehicle;
    one or more processors configured to
        display a first pattern by causing the light-emitting part to blink in conjunction with operation of the windshield wiper; and
        use the image captured by the camera to acquire a second pattern displayed by a blinking of a light-emitting part of a separate vehicle, wherein
    the one or more processors are further configured to create the first pattern to be a copy of the second pattern.
2. The vehicle according to claim 1, wherein the light-emitting part of the separate vehicle is installed on a rear windshield wiper of the separate vehicle, and the camera is a front camera configured to capture an image of a forward area of the vehicle.
3. The vehicle according to claim 1, wherein the light-emitting part of the vehicle is an infrared light-emitting part or an ultraviolet light-emitting part.
4. The vehicle according to claim 1, wherein the one or more processors are configured to display a two-dimensional code as the first pattern.
5. The vehicle according to claim 1, wherein the one or more processors are configured to display the copy of the second pattern as the first pattern by the light-emitting part of the vehicle.

* * * * *